United States Patent
Ono et al.

(10) Patent No.: US 11,512,748 B2
(45) Date of Patent: Nov. 29, 2022

(54) CLUTCH CONTROL APPARATUS

(71) Applicant: HONDA MOTOR CO., LTD., Tokyo (JP)

(72) Inventors: Junya Ono, Wako (JP); Akira Tokito, Wako (JP); Tatsuya Ryuzaki, Wako (JP); Kohei Matsuura, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/437,429

(22) PCT Filed: Mar. 10, 2020

(86) PCT No.: PCT/JP2020/010278
§ 371 (c)(1),
(2) Date: Sep. 9, 2021

(87) PCT Pub. No.: WO2020/195789
PCT Pub. Date: Oct. 1, 2020

(65) Prior Publication Data
US 2022/0178409 A1 Jun. 9, 2022

(30) Foreign Application Priority Data
Mar. 26, 2019 (JP) .............................. JP2019-059129

(51) Int. Cl.
*F16D 48/06* (2006.01)
*F16D 25/0638* (2006.01)

(52) U.S. Cl.
CPC ....... *F16D 48/066* (2013.01); *F16D 25/0638* (2013.01); *F16D 2500/1026* (2013.01); *F16D 2500/30404* (2013.01)

(58) Field of Classification Search
CPC ............... F16D 48/066; F16D 25/0638; F16D 2500/1026; F16D 2500/30404
See application file for complete search history.

(56) References Cited

U.S. PATENT DOCUMENTS 8,983,746 B1 * 3/2015 Song ................... F16D 48/06
701/68
10,718,389 B2 * 7/2020 Kim ..................... F16D 48/02
(Continued)

FOREIGN PATENT DOCUMENTS

JP 11-037177 2/1999
JP 2005-054908 3/2005
(Continued)

OTHER PUBLICATIONS

International Search Report and Written Opinion for International Application No. PCT/JP2020/010278 dated Jun. 2, 2020, 8 pages.
(Continued)

*Primary Examiner* — Stacey A Fluhart
(74) *Attorney, Agent, or Firm* — Amin, Turocy & Watson, LLP

(57) ABSTRACT

This clutch control apparatus includes: a clutch device that connects and disconnects a power transmission between an engine and a drive wheel; a clutch actuator that drives the clutch device and changes a clutch capacity; a driven mechanism that is arranged between the clutch actuator and the clutch device, is operated by a drive of the clutch actuator, and operates the clutch device; a control part that calculates a control target value of the clutch capacity; and a temperature sensor that measures a temperature of the driven mechanism, wherein the control part corrects the control target value based on the temperature measured by the temperature sensor.

12 Claims, 9 Drawing Sheets

(56) References Cited

U.S. PATENT DOCUMENTS

| | | | |
|---|---|---|---|
| 2005/0087032 A1 | 4/2005 | Kawakubo et al. | |
| 2013/0025999 A1* | 1/2013 | Schindler | F16D 48/066 |
| | | | 192/85.63 |
| 2013/0206533 A1* | 8/2013 | Mepham | F16H 57/0446 |
| | | | 192/48.601 |
| 2018/0273042 A1* | 9/2018 | Ono | F16H 63/502 |

FOREIGN PATENT DOCUMENTS

| | | |
|---|---|---|
| JP | 2010-169169 | 8/2010 |
| JP | 2013-527389 | 6/2013 |

OTHER PUBLICATIONS

International Search Report and Written Opinion for International Application No. PCT/JP2020/010278 dated Jun. 2, 2019, 8 pages.

\* cited by examiner

CLUTCH CONTROL APPARATUS

TECHNICAL FIELD

The present invention relates to a clutch control apparatus.

Priority is claimed on Japanese Patent Application No. 2019-059129, filed on Mar. 26, 2019, the contents of which are incorporated herein by reference.

BACKGROUND

Conventionally, a clutch is known in which a clutch connection/disconnection operation is automatically performed by a drive of an actuator. In such a clutch, when a temperature inside the clutch changes due to friction between plates that constitute the clutch or the like, a timing (touch point) at which the plates come into contact with or are separated from each other fluctuates when the clutch is connected to or disconnected.

On the other hand, Patent Document 1 discloses a configuration that estimates a heat generation amount due to friction between the plates and performs a notification for prompting a shift change on the basis of the estimated heat generation amount.

RELATED ART DOCUMENTS

Patent Documents

[Patent Document 1]
Japanese Unexamined Patent Application, First Publication No. 2010-169169

SUMMARY OF INVENTION

Problems to be Solved by the Invention

However, in Patent Document 1, the heat generation amount by the friction between the plates is estimated, but an estimation value of the heat generation amount may differ from an actual temperature. When the estimation value of the heat generation amount is different from the actual temperature, a control accuracy such as a timing of the notification performed on the basis of the estimation value of the heat generation amount may be degraded.

Accordingly, an object of the present invention is to reduce a temperature effect and perform a further highly accurate control in a clutch control apparatus.

Means for Solving the Problem

As a means for solving the problem described above, an aspect of the present invention has the following configurations.

A clutch control apparatus according to a first aspect of the present invention includes: a clutch device that connects and disconnects a power transmission between an engine and a drive wheel; a clutch actuator that drives the clutch device and changes a clutch capacity; a driven mechanism that is arranged between the clutch actuator and the clutch device, is operated by a drive of the clutch actuator, and operates the clutch device; a control part that calculates a control target value of the clutch capacity; and a temperature sensor that measures a temperature of the driven mechanism, wherein the control part corrects the control target value based on the temperature measured by the temperature sensor.

A second aspect is the clutch control apparatus according to the first aspect described above, wherein the engine may include a cover member that covers an outer part of the engine, and the driven mechanism and the temperature sensor may be arranged on the cover member.

A third aspect is the clutch control apparatus according to the second aspect described above, wherein the cover member may be a clutch cover that covers the clutch device.

A fourth aspect is the clutch control apparatus according to the second or third aspect described above, wherein the cover member may include a fixation part having a cylindrical shape to which the driven mechanism is fitted, and the temperature sensor may be attached to the fixation part.

A fifth aspect is the clutch control apparatus according to any one of the first to fourth aspects described above, wherein the driven mechanism may be a slave cylinder that includes a piston which is driven by a hydraulic pressure.

A sixth aspect is the clutch control apparatus according to any one of the first to fifth aspects described above, wherein a detection part of the temperature sensor may be provided to be directed toward the driven mechanism.

A seventh aspect is the clutch control apparatus according to any one of the first to sixth aspects described above, wherein the control part may reduce the control target value as the temperature measured by the temperature sensor becomes higher.

An eighth aspect is the clutch control apparatus according to any one of the first to seventh aspects described above, wherein the control target value may be a value that corresponds to a point at which a connection of the clutch device starts.

Advantage of the Invention

According to the clutch control apparatus of the first aspect of the present invention, by correcting the control target value of the clutch capacity on the basis of an actual measurement value of the temperature of the driven mechanism measured by the temperature sensor, it is possible to perform a further highly accurate control compared to a configuration that estimates a temperature around the clutch and performs a control.

According to the clutch control apparatus of the second aspect of the present invention, by arranging the driven mechanism and the temperature sensor on the cover member that covers the outer part of the engine, the temperature sensor is arranged close to the driven mechanism, the temperature of the driven mechanism is directly measurable, and it is possible to perform a further highly accurate control.

According to the clutch control apparatus of the third aspect of the present invention, by arranging the driven mechanism and the temperature sensor on the clutch cover that covers the clutch device, the driven mechanism is arranged close to the clutch device, the driven mechanism and the clutch device are capable of directly interlocking with each other, the temperature sensor is arranged close to the driven mechanism, the temperature of the driven mechanism is directly measurable, and it is possible to perform a further highly accurate control.

According to the clutch control apparatus of the fourth aspect of the present invention, by also fixing the temperature sensor to the fixation part having a cylindrical shape for fixing the driven mechanism in the cover member, the fixation part concurrently serves as the fixation part of the driven mechanism and the fixation part of the temperature sensor, and it is possible to reduce the size and weight by rationalization.

According to the clutch control apparatus of the fifth aspect of the present invention, by detecting the temperature of the hydraulically operated slave cylinder that is susceptible to the temperature and performing a control, it is possible to perform a further highly accurate control.

According to the clutch control apparatus of the sixth aspect of the present invention, since the detection part of the temperature sensor is provided to be directed toward the driven mechanism, it is possible to further accurately detect the temperature of the driven mechanism and perform a further highly sensitive control.

According to the clutch control apparatus of the seventh aspect of the present invention, since the control target value is reduced as the temperature measured by the temperature sensor becomes higher, it is possible to appropriately adjust a point at which the clutch device is connected and disconnected in accordance with the thermal expansion such as a clutch plate that constitutes the clutch device, and it is possible to perform a further highly sensitive control.

According to the clutch control apparatus of the eighth aspect of the present invention, by correcting the control target value (clutch capacity) that corresponds to the point (touch point) at which the connection of the clutch device starts, it is possible to reduce a temperature effect in the connection/disconnection control of the clutch device and perform a highly accurate control.

DESCRIPTION OF THE EMBODIMENTS

Figure 1:
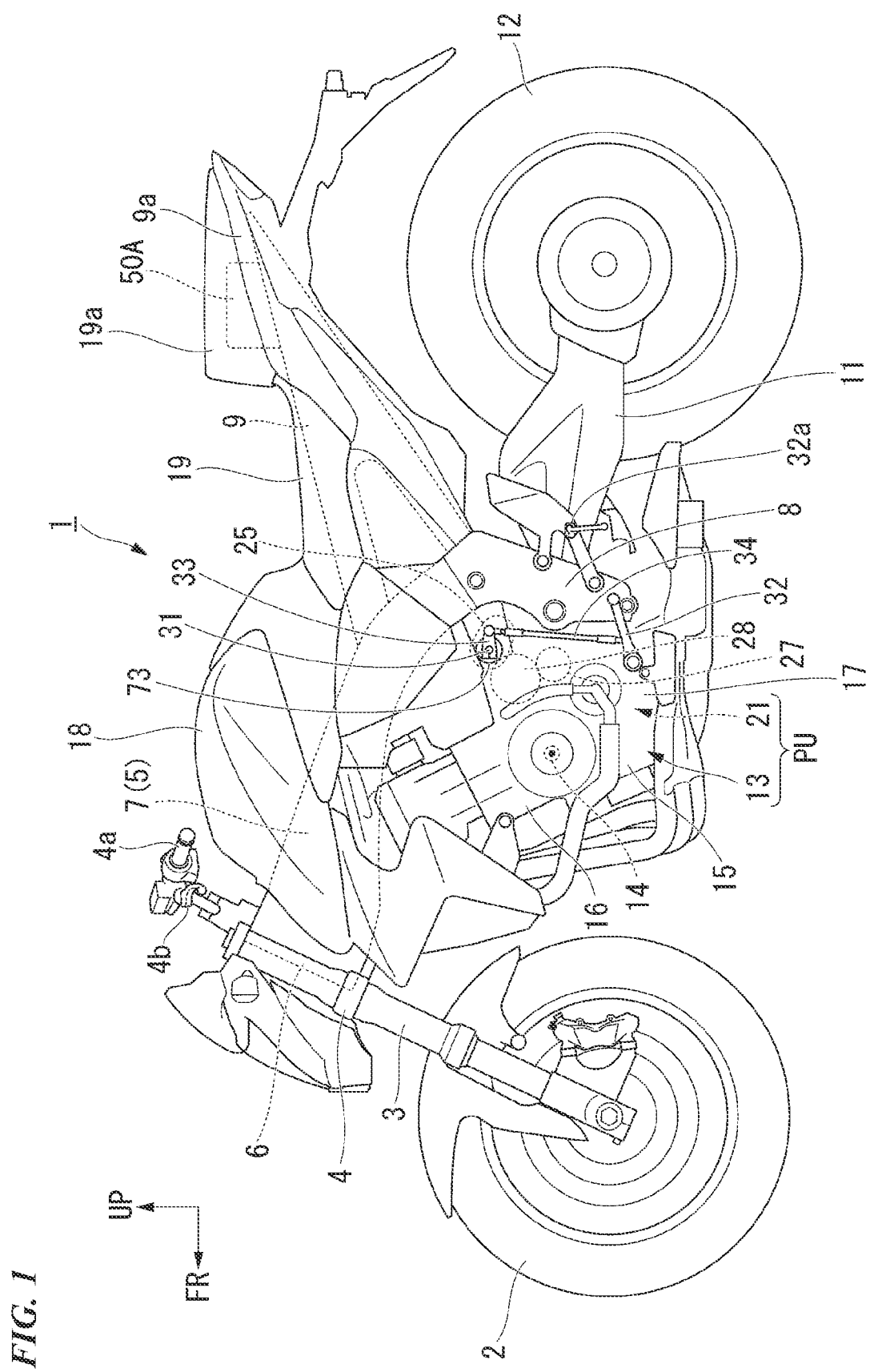
FIG. 1 is a left side view of a motorcycle in an embodiment of the present invention.

Hereinafter, an embodiment of the present invention will be described with reference to the drawings. The orientations of the front, rear, left, right, and the like in the following description are the same as the orientations in the vehicle described below unless otherwise specified. Further, in appropriate positions in the drawing used in the following description, an arrow FR that indicates a vehicle frontward direction, an arrow LH that indicates a vehicle leftward direction, and an arrow UP that indicates a vehicle upward direction are shown.

<Entire Vehicle>

As shown in FIG. 1, the present embodiment is applied to a motorcycle 1 which is a saddle-riding type vehicle. A front wheel 2 of the motorcycle 1 is supported by lower end parts of a pair of left and right front forks 3.

Upper parts of the left and right front forks 3 are supported by a head pipe 6 at a front end part of a vehicle body frame 5 via a steering stem 4. A bar-type steering handle 4a is attached on a top bridge of the steering stem 4.

The vehicle body frame 5 includes a head pipe 6, a main tube 7 that extends downward and rearward from the head pipe 6 at a middle in a vehicle width direction (left-to-right direction), left and right pivot frames 8 that continue to a lower rear end part of the main tube 7, and a seat frame 9 that continues in a rear direction of the main tube 7 and the left and right pivot frames 8. A front end part of a swing arm 11 is swingably supported by the left and right pivot frames 8. A rear wheel (drive wheel) 12 of the motorcycle 1 is supported by a rear end part of the swing arm 11.

A fuel tank 18 is supported above the left and right main tubes 7. A front seat 19 and a rear seat cover 19a are supported to be aligned in a front-to-rear direction behind the fuel tank 18 and above the seat frame 9. A circumference of the seat frame 9 is covered by the rear cowl 9a. A power unit PU which is an engine of the motorcycle 1 is suspended below the left and right main tubes 7. For example, the power unit PU is linked to the rear wheel 12 via a chain-type transmission mechanism.

The power unit PU integrally includes an engine (an internal combustion engine, a motor) 13 that is positioned on a front side of the power unit PU and a transmission 21 that is positioned on a rear side of the power unit PU. For example, the engine 13 is a multi-cylinder engine in which a rotation axis of a crankshaft 14 (hereinafter, also referred to as a "crank axis 14") is along a left-to-right direction (vehicle width direction). In the engine 13, a cylinder 16 stands upward at a front part of a crankcase 15. A rear part of the crankcase 15 is a transmission case 17 that accommodates the transmission 21.

<Transmission>

Figure 2:
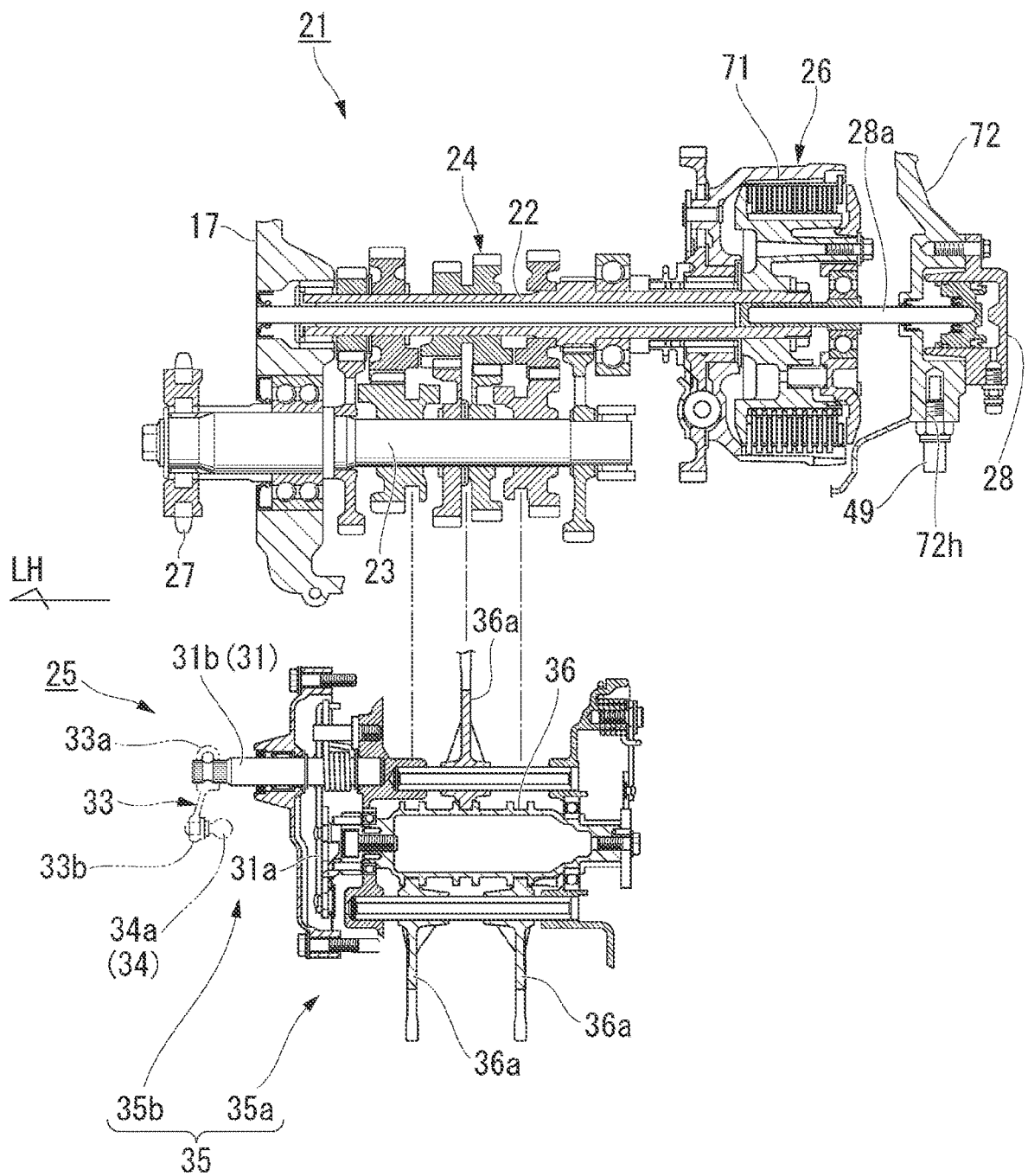
FIG. 2 is a cross-sectional view of a transmission and a change mechanism of the motorcycle.

As shown in FIG. 2, the transmission 21 is a stage-type transmission that includes a main shaft 22, a counter shaft 23, and a transmission gear group 24 that spans both shafts 22 and 23. The counter shaft 23 (hereinafter, also referred to as a "counter axis 23") constitutes an output shaft of the transmission 21 and the power unit PU. An end part of the counter shaft 23 protrudes to a left side of a rear part of the crankcase 15 and is connected to the rear wheel 12 via the chain-type transmission mechanism.

The transmission gear group 24 includes gears equal in number to gear shift stages that are each supported by the shafts 22 and 23. The transmission 21 is a constantly-engaged-type transmission in which corresponding gear pairs of the transmission gear group 24 are always engaged with each other between the shafts 22 and 23. A plurality of gears supported by the shafts 22 and 23 are classified into a free gear that is rotatable with respect to a corresponding shaft and a slide gear (shifter) that is spline-fitted to a corresponding shaft. A dog that protrudes in an axis direction is provided on one of the free gear and the slide gear, and a slot that is recessed in the axis direction and is engaged with the dog is provided on another of the free gear and the slide gear. That is, the transmission 21 is a so-called dog transmission.

Figure 3:
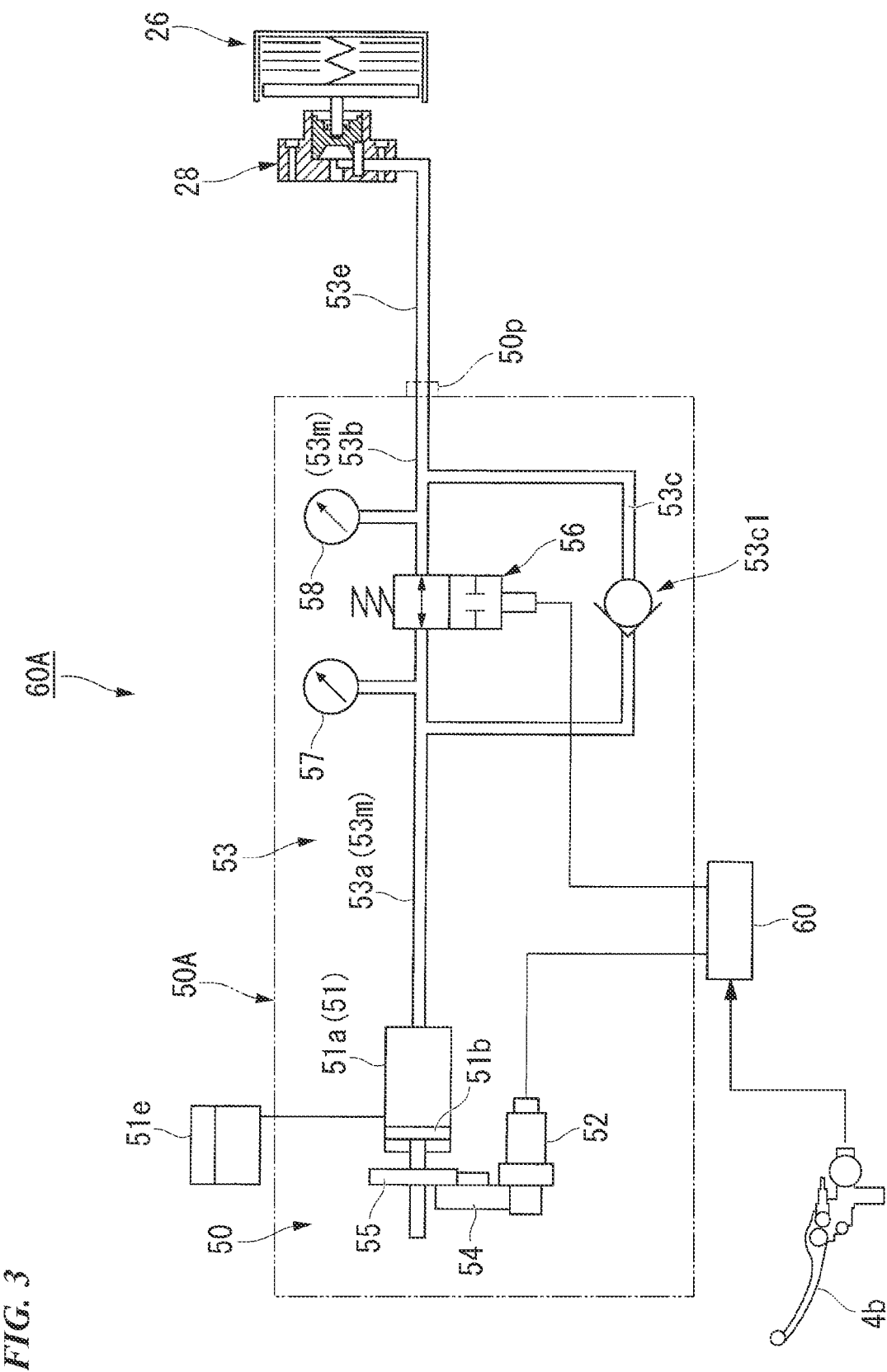
FIG. 3 is a schematic view of a clutch operation system that includes a clutch actuator.

With reference also to FIG. 3, the main shaft 22 and the counter shaft 23 of the transmission 21 are arranged to be aligned in a front-to-rear direction behind the crankshaft 14. A clutch device 26 that is operated by a clutch actuator 50 is coaxially arranged on a right end part of the main shaft 22. For example, the clutch device 26 is a wet-type multi-plate clutch and is a so-called normally open clutch. That is, the clutch device 26 becomes in a connection state in which power can be transmitted by a hydraulic pressure supply from the clutch actuator 50 and returns to a disconnection state in which power cannot be transmitted when the hydraulic pressure supply from the clutch actuator 50 is shut off.

The clutch device 26 includes a clutch plate 71 formed of a plurality of sheets laminated in a center axis direction (left-to-right direction) of the main shaft 22. The plurality of clutch plates 71 come into contact with and are separated from each other by moving a rod 28a in the left-to-right direction using a slave cylinder (driven mechanism) 28 described later. The clutch device 26 is connected and disconnected by the contact and separation of the plurality of clutch plates 71.

With reference to FIG. 2, a rotation power of the crankshaft 14 is transmitted to the main shaft 22 via the clutch device 26 and is transmitted to the counter shaft 23 via an arbitrary gear pair of the transmission gear group 24 from the main shaft 22. A drive sprocket 27 of the chain-type transmission mechanism described above is attached to a left end part of the counter shaft 23 that protrudes to the left side of a rear part of the crankcase 15.

A change mechanism 25 that switches the gear pair of the transmission gear group 24 is accommodated in a rear upper part of the transmission case 21. By the rotation of a shift drum 36 having a hollow cylindrical shape parallel to both shafts 22 and 23, the change mechanism 25 operates a plurality of shift forks 36a in accordance with a pattern of a lead groove formed on an outer circumference of the shift drum 36 and switches the gear pair used for power transmission between the shafts 22 and 23 in the transmission gear group 24.

The change mechanism 25 includes a shift spindle 31 that is parallel to the shift drum 36. At the time of rotation of the shift spindle 31, a shift arm 31a that is fixed to the shift spindle 31 rotates the shift drum 36, and the change mechanism 25 moves the shift fork 36a in the axis direction in accordance with the pattern of the lead groove and switches a gear pair that can transmit power in the transmission gear group 24 (that is, the transmission stage is switched).

In the shift spindle 31, a shaft outer part 31b protrudes outward (leftward) in the vehicle width direction of the crankcase 15 in order to make the change mechanism 25 operable. A shift load sensor 73 (a shift operation detection means) is coaxially attached to the shaft outer part 31b of the shift spindle 31 (refer to FIG. 1). A swing lever 33 is attached to the shaft outer part 31b (or the rotation axis of the shift load sensor 73) of the shift spindle 31. The swing lever 33 extends rearward from a base end part 33a that is clamped and fixed to the shift spindle 31 (or a rotation shaft), and an upper end part of a link rod 34 is swingably connected via an upper ball joint 34a to the front end part 33b of the swing lever 33. A lower end part of the link rod 34 is swingably connected via a lower ball joint (not shown) to the shift pedal 32 that is operated by a driver using his/her foot.

As shown in FIG. 1, a front end part of the shift pedal 32 is supported swingably upward and downward by a lower part of the crankcase 15 via a shaft along the left-to-right direction. A pedal part on which the toe of the driver's foot placed on a step 32a is placed is provided on a rear end part of the shift pedal 32, and a lower end part of the link rod 34 is connected to a middle part in the front-to-rear direction of the shift pedal 32.

As shown in FIG. 2, a shift change device 35 that switches gears of the gear shift stage of the transmission 21 is constituted to include the shift pedal 32, the link rod 34, and the change mechanism 25. In the shift change device 35, an aggregate (the shift drum 36, the shift forks 36a, and the like) that switches the gear shift stage of the transmission 21 in the transmission case 17 is referred to as a gear shift operation part 35a, and an aggregate (the shift spindle 31, the shift arm 31a, and the like) that rotates around an axis of the shift spindle 31 in response to an input of a gear shift operation to the shift pedal 32 and transmits the rotation to the gear shift operation part 35a is referred to as a gear shift operation reception part 35b.

Here, the motorcycle 1 employs a so-called semi-automatic transmission system (automatic clutch-type transmission system) in which a driver performs only a gear shift operation (a foot operation of the shift pedal 32) of the transmission 21, and a connection/disconnection operation of the clutch device 26 is automatically performed by an electric control in response to the operation of the shift pedal 32.

<Transmission System>

Figure 4:
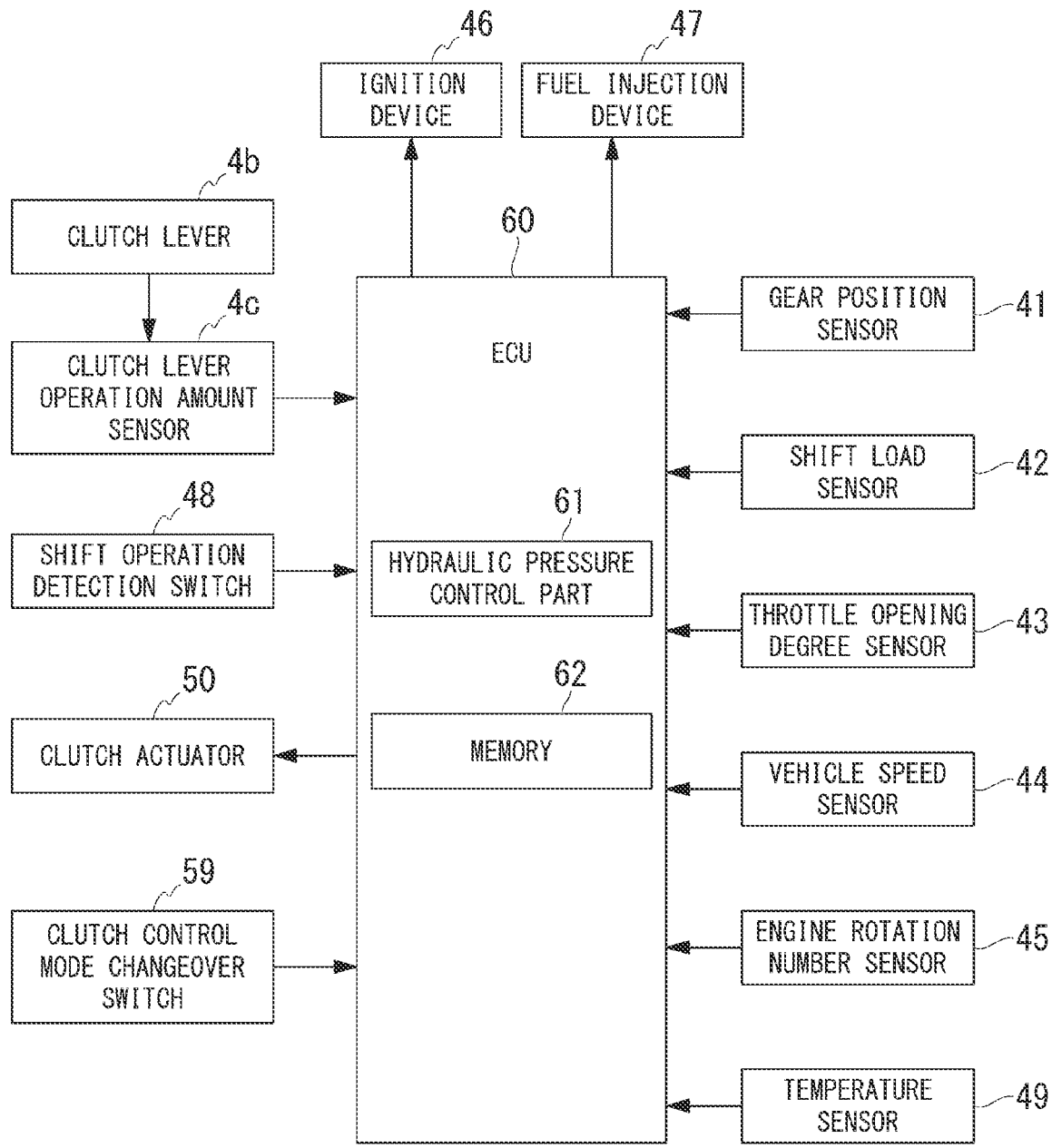
FIG. 4 is a block diagram of a transmission system.

As shown in FIG. 4, the transmission system includes the clutch actuator 50, an ECU 60 (Electronic Control Unit, a control part), and a variety of sensors 41 to 45 and 49.

The ECU 60 operates and controls the clutch actuator 50 and operates and controls an ignition device 46 and a fuel injection device 47 on the basis of detection information from a gear position sensor 41 that detects the gear shift stage from a rotation angle of the shift drum 36 and a shift load sensor 42 (for example, a torque sensor) that detects an operation torque input to the shift spindle 31, a variety of vehicle state detection information or the like from a throttle opening degree sensor 43, a vehicle speed sensor 44, an engine rotation number sensor 45, and the like. Detection information from a temperature sensor 49 described later, hydraulic pressure sensors 57 and 58, and a shift operation detection switch (shift neutral switch) 48 is also input to the ECU 60.

The ECU 60 includes a hydraulic pressure control part (clutch control part) 61 and a memory (storage part) 62, and functions thereof will be described later.

With reference also to FIG. 3, the clutch actuator 50 is operated and controlled by the ECU 60 and is thereby capable of controlling a fluid pressure that connects and disconnects the clutch device 26. The clutch actuator 50 includes an electric motor 52 (hereinafter, simply referred to as a "motor 52") as a drive source and a master cylinder 51 that is driven by the motor 52. The clutch actuator 50 constitutes an integral clutch control unit 50A together with a hydraulic circuit device 53 that is provided between the master cylinder 51 and a hydraulic pressure supply/discharge port 50p.

The ECU 60 calculates a target value (target hydraulic pressure) of a hydraulic pressure supplied to the slave cylinder 28 for connecting and disconnecting the clutch device 26 on the basis of a preset calculation program and controls the clutch control unit 50A such that a hydraulic pressure (slave hydraulic pressure) on the slave cylinder 28 side that is detected by a downstream-side hydraulic pressure sensor 58 approaches the target hydraulic pressure.

The master cylinder 51 strokes a piston 51b inside a cylinder main body 51a by a drive of the motor 52 and is capable of supplying and discharging the operation oil inside the cylinder main body 51a with respect to the slave cylinder 28. Reference numeral 55 in the drawing represents a conversion mechanism as a ball screw mechanism, reference numeral 54 represents a transmission mechanism that spans the motor 52 and the conversion mechanism 55, and reference numeral 51e represents a reservoir that is connected to the master cylinder 51.

The hydraulic circuit device 53 includes a valve mechanism (a solenoid valve 56) that opens or blocks a middle part of a main oil passage (hydraulic pressure supply/discharge oil passage) 53m that extends from the master cylinder 51 to the clutch device 26 side (the slave cylinder 28 side). The main oil passage 53m of the hydraulic circuit device 53 is divided into an upstream-side oil passage 53a that is closer to the master cylinder 51 than the solenoid valve 56 and a downstream-side oil passage 53b that is closer to the slave cylinder 28 than the solenoid valve 56. The hydraulic circuit device 53 further includes a bypass oil passage 53c that bypasses the solenoid valve 56 and allows the upstream-side oil passage 53a and the downstream-side oil passage 53b to communicate with each other.

The solenoid valve 56 is a so-called normally open valve. A one-way valve 53c1 that allows the operation oil to flow only in a direction from an upstream side to a downstream side is provided on the bypass oil passage 53c. An upstream-side hydraulic pressure sensor 57 that detects a hydraulic pressure of the upstream-side oil passage 53a is provided on the upstream side of the solenoid valve 56. A downstream-side hydraulic pressure sensor 58 that detects a hydraulic pressure of the downstream-side oil passage 53b is provided on the downstream side of the solenoid valve 56.

As shown in FIG. 1, for example, the clutch control unit 50A is accommodated inside the rear cowl 9a. The slave cylinder 28 is attached to a left rear part of the crankcase 15. The clutch control unit 50A and the slave cylinder 28 are connected via an oil pressure pipe arrangement 53e (refer to FIG. 3).

As shown in FIG. 2, the slave cylinder 28 is arranged coaxially at a right position of the clutch device 26. The slave cylinder 28 presses a push rod 28a leftward when supplying the hydraulic pressure from the clutch actuator 50. The slave cylinder 28 presses the push rod 28a leftward and thereby causes the clutch device 26 to be in a connection state via the push rod 28a. The slave cylinder 28 releases the pressing of the push rod 28a and allows the clutch device 26 to return to a disconnection state when the hydraulic pressure is not supplied.

Figure 7:
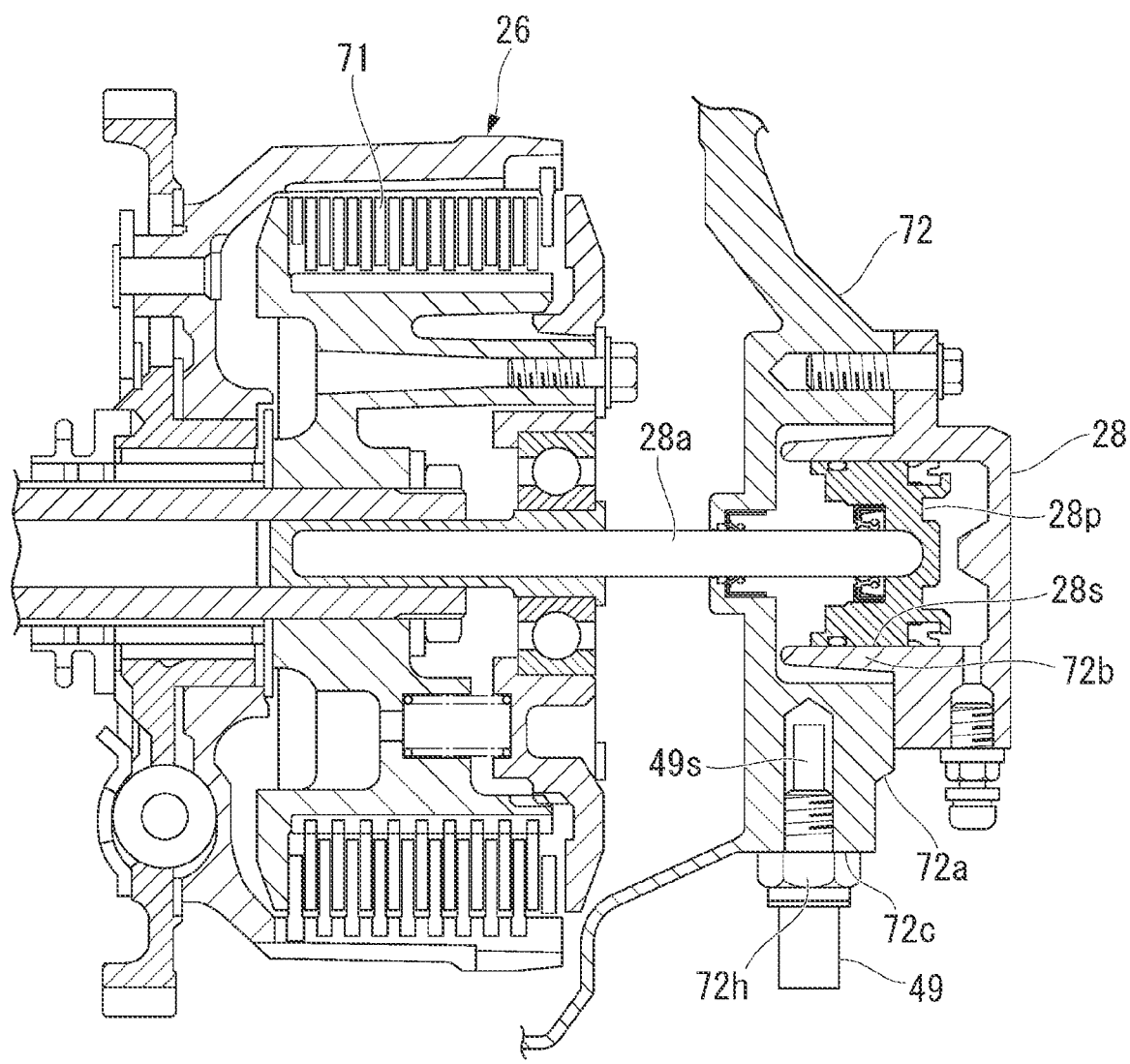
FIG. 7 is a cross-sectional view showing a clutch device and a slave cylinder.
Figure 8:
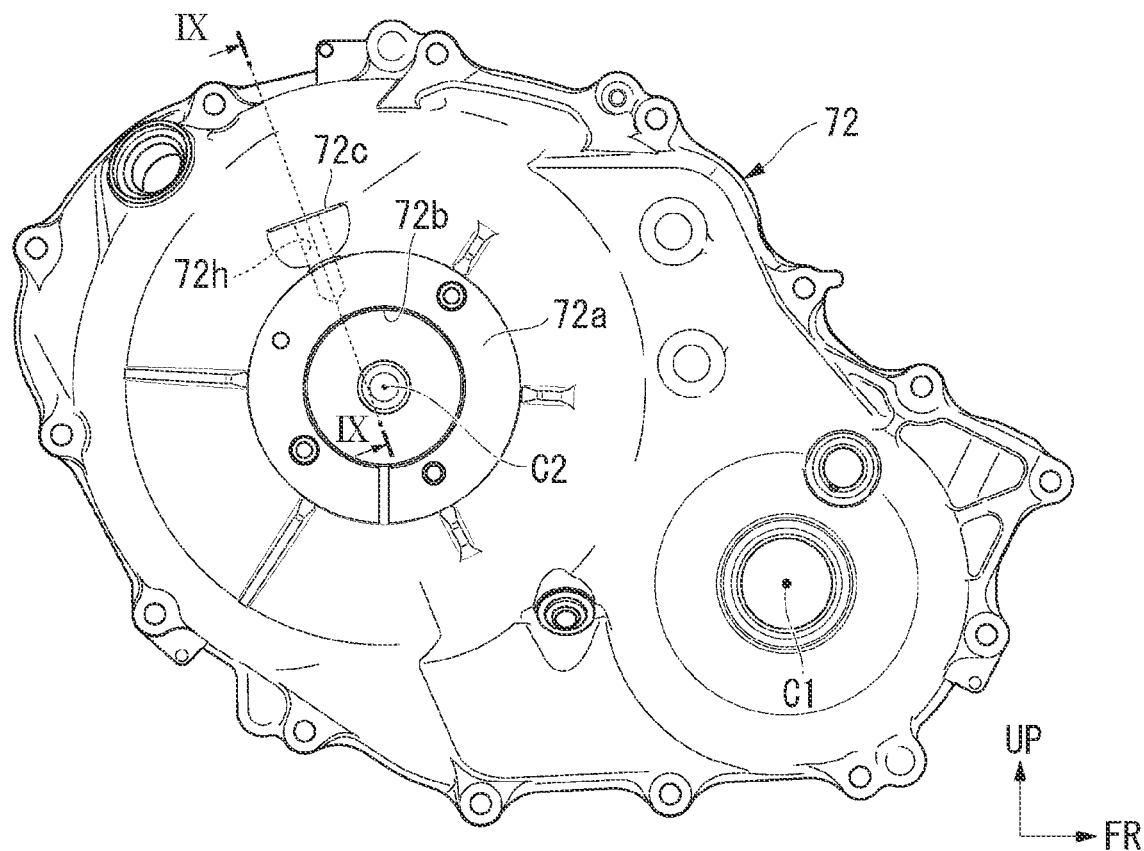
FIG. 8 is a side view of a clutch cover.
Figure 9:
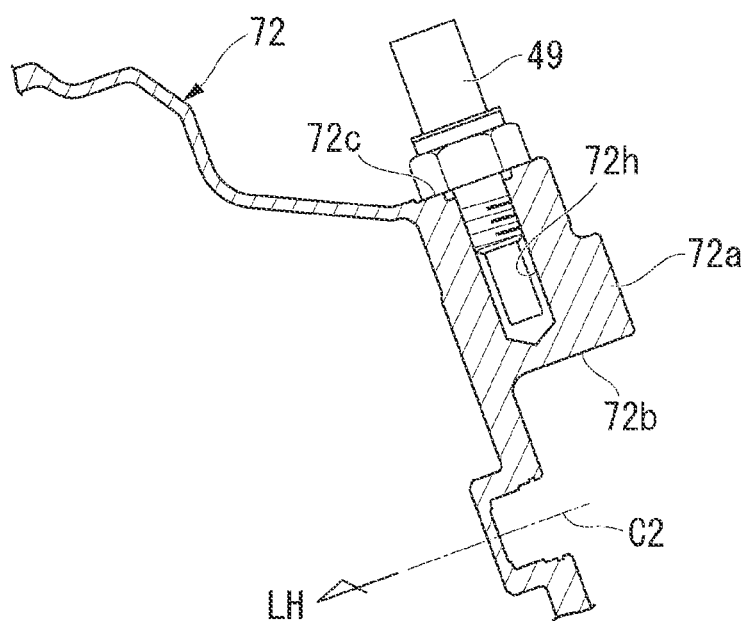
FIG. 9 is a IX-IX cross-sectional view of FIG. 8.

As shown in FIG. 7 to FIG. 9, the slave cylinder 28 is fixed to a clutch cover (cover member) 72 that covers the clutch device 26. The clutch cover 72 includes a cylinder fixation part (fixation part) 72a that fixes the slave cylinder 28. A cylindrical accommodation recess part 72b having a bottom and recessed inward in the width direction of the vehicle body is formed on the cylinder fixation part 72a. The slave cylinder 28 is fitted and fixed to the inside of the accommodation recess part 72b from the outside in the vehicle width direction. Reference numeral C1 in the drawing represents an axis center of the crankshaft 14, and reference numeral C2 represents an axis center of the main shaft 22 and the clutch device 26.

The slave cylinder 28 includes a cylinder part 28s having a cylindrical shape along the left-to-right direction and a piston 28p that is movable in the left-to-right direction inside the cylinder part 28s. The slave cylinder 28 drives the piston 28p back and forth in the left-to-right direction inside the cylinder part 28s by a hydraulic pressure supply from the clutch actuator 50. One end of the push rod 28a is connected to the piston 28p. The hydraulic pressure generated by the clutch actuator 50 is supplied to the push rod 28a, and thereby, the push rod 28a is driven back and forth in the left-to-right direction together with the piston 28p. By the push rod 28a being driven back and forth, a pressure plate of the clutch device 26 is operated allowing the plurality of clutch plates 71 to come into contact with and be separated from each other, and the clutch device 26 is connected and disconnected.

The temperature sensor 49 described above is arranged on an outer circumferential part of the slave cylinder 28. The temperature sensor 49 measures the temperature of the slave cylinder 28. The temperature sensor 49 is arranged on the cylinder fixation part 72a. The temperature sensor 49 is inserted into and fixed to a sensor accommodation recess part 72h that is formed on an upper rear part of the cylinder fixation part 72a. The sensor accommodation recess part sensor recess 72h is provided to penetrate along a radial direction of the cylinder fixation part 72a.

The temperature sensor 49 defines a rod shape that extends in one direction. The temperature sensor 49 is arranged to extend along the radial direction of the cylinder fixation part 72a (such that the longitudinal direction is directed in the radial direction of the cylinder fixation part 72a). A detection part 49s is provided on one end part in the longitudinal direction of the temperature sensor 49. The temperature sensor 49 is inserted into the sensor accommodation recess part 72h from one end side in the longitudinal direction and is fixed by screwing. The detection part 49s is provided to be directed toward the slave cylinder 28 in the sensor accommodation recess part 72h. Reference numeral 72c in the drawing represents a sensor attachment seat surface which is formed on an outer circumferential part of the cylinder fixation part 72a and at which the sensor accommodation recess part 72h opens.

In the embodiment, the clutch cover 72 is a cover member that covers a right side part of the engine 13, and the slave cylinder 28 and the temperature sensor 49 are arranged on the cover member; however, the embodiment is not limited thereto. For example, the slave cylinder 28 and the temperature sensor 49 may be arranged on a cover member that covers a left side part of the engine 13.

In order to maintain the clutch device 26 in a connection state, it is necessary to continue the hydraulic pressure supply, but electric power is consumed by an amount required for continuing the hydraulic pressure supply. Accordingly, as shown in FIG. 3, the solenoid valve 56 is provided on the hydraulic circuit device 53 of the clutch control unit 50A, and the solenoid valve 56 is closed after the hydraulic pressure supply to the clutch device 26 side. Thereby, energy consumption is prevented by employing a configuration in which the hydraulic pressure supplied to the clutch device 26 side is maintained, and the hydraulic pressure is supplemented by an amount of pressure decrease (only the leakage amount is recharged).

<Clutch Control>

Figure 5:
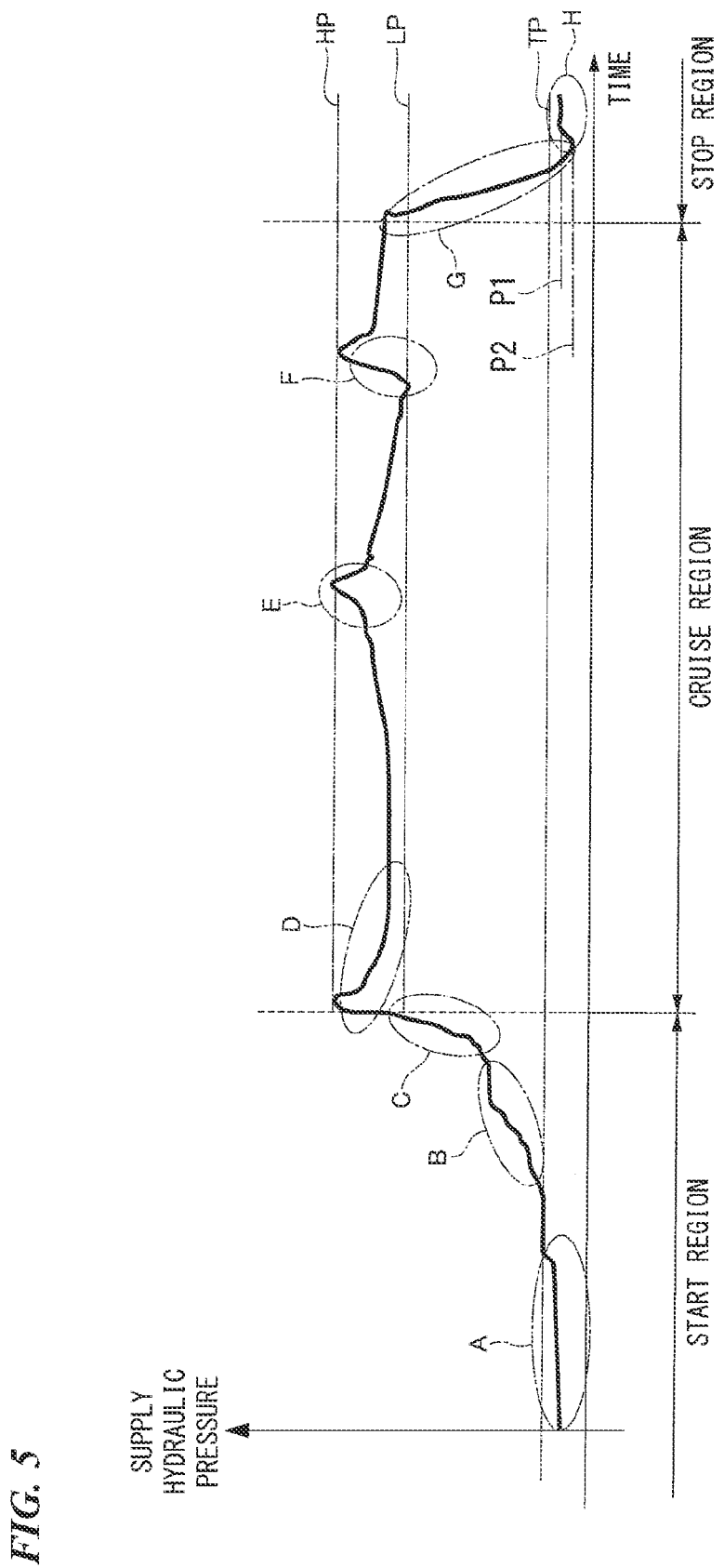
FIG. 5 is a graph showing a change in a supply hydraulic pressure of the clutch actuator.

Next, an operation of a clutch control system is described with reference to a graph of FIG. 5. In the graph of FIG. 5, the vertical axis represents a supply hydraulic pressure detected by the downstream-side hydraulic pressure sensor 58, and the horizontal axis represents an elapsed time.

When the motorcycle 1 is stopped (at the time of idling), the solenoid valve 56 controlled by the ECU 60 is in an open state. At this time, the slave cylinder 28 side (downstream side) is in a low-pressure state that is lower than a touch point hydraulic pressure (point) TP, and the clutch device 26 is in a non-engaged state (disconnection state, release state). This state corresponds to a region A in FIG. 5.

In a state where the vehicle is stopped in a gear connection state, electric power is supplied to the motor 52, and a slight amount of hydraulic pressure is generated. This is in order to immediately connect the clutch and start the vehicle.

When a rotation number of the engine 13 is increased at the time of starting the motorcycle 1, electric power is supplied only to the motor 52, and a hydraulic pressure is supplied from the master cylinder 51 to the slave cylinder 28 via the solenoid valve 56 that is in an open state. When the hydraulic pressure on the slave cylinder 28 side (downstream side) increases to equal to or higher than the touch point hydraulic pressure TP, engagement of the clutch device 26 is started, and the clutch device 26 becomes in a half-clutch state in which some of the power can be transmitted. Thereby, the motorcycle 1 can start smoothly. This state corresponds to a region B in FIG. 5.

When a difference between the input rotation and the output rotation of the clutch device 26 is reduced, and the hydraulic pressure on the slave cylinder 28 side (downstream side) reaches a lower limit holding hydraulic pressure LP, the engagement of the clutch device 26 shifts to a lock state, and all of the driving force of the engine 13 is transmitted to the transmission 21. This state corresponds to a region C in FIG. 5. The regions A to C are defined as a start region.

When the hydraulic pressure is supplied from the master cylinder 51 side to the slave cylinder 28 side, the solenoid valve 56 is made to be in an open state, electric power is distributed to the motor 52, the motor 52 is driven to be normally rotated, and the master cylinder 51 is pressurized. Thereby, the hydraulic pressure on the slave cylinder 28 side is adjusted to a clutch engagement hydraulic pressure. At this time, the drive of the clutch actuator 50 is feedback-controlled on the basis of a detection hydraulic pressure of the downstream-side hydraulic pressure sensor 58.

Then, when the hydraulic pressure on the slave cylinder 28 side (downstream side) reaches an upper limit holding hydraulic pressure HP, electric power is supplied to the solenoid valve 56, the solenoid valve 56 is operated to be closed, electric power supply to the motor 52 is stopped, and generation of the hydraulic pressure is stopped. That is, the downstream side is maintained at a high-pressure state (the upper limit holding hydraulic pressure HP) while the hydraulic pressure is released, and the upstream side becomes in a low-pressure state. Thereby, the clutch device 26 is maintained in the engaged state without generating a hydraulic pressure by the master cylinder 51, and electric power consumption can be reduced while enabling the motorcycle 1 to travel.

Here, depending on a gear shift operation, there may be a case in which the gear shift is performed immediately after the clutch device 26 is filled with the hydraulic pressure. In this case, before the solenoid valve 56 is operated to be closed and bring the upstream side into a low-pressure state, the motor 52 is reversely driven while the solenoid valve 56 remains in an open state, the master cylinder 51 is depressurized and causes the reservoir 51e to communicate, and the hydraulic pressure on the clutch device 26 side is relieved to the master cylinder 51 side. At this time, the drive of the clutch actuator 50 is feedback-controlled on the basis of the detection hydraulic pressure of the upstream-side hydraulic pressure sensor 57.

Even in a state where the solenoid valve 56 is closed and the clutch device 26 is maintained in the engaged state, the hydraulic pressure on the downstream side gradually decreases (leaks) as in a region D of FIG. 5. That is, the hydraulic pressure on the downstream side gradually decreases due to factors such as a decrease in temperature or a hydraulic pressure leakage according to deformation of the seal of the solenoid valve 56 and the one-way valve 53c1 or the like.

On the other hand, as in a region E of FIG. 5, the hydraulic pressure on the downstream side may increase due to an increase in temperature or the like. When variation in hydraulic pressure on the downstream side is minute, the variation can be absorbed by an accumulator (not shown), and the increase in electric power consumption due to the operation of the motor 52 and the solenoid valve 56 every time the hydraulic pressure varies does not occur.

In a case where the hydraulic pressure on the downstream side increases to the upper limit holding hydraulic pressure HP as in the region E of FIG. 5, the solenoid valve 56 is brought into an open state in a step-by-step manner by reducing the electric power supply to the solenoid valve 56 or the like, and the hydraulic pressure on the downstream side is relieved to the upstream side.

In a case where the hydraulic pressure on the downstream side decreases to the lower limit holding hydraulic pressure LP as in a region F of FIG. 5, the electric power supply to the motor 52 is started while the solenoid valve 56 remains closed, and the hydraulic pressure on the upstream side is increased. When the hydraulic pressure on the upstream side exceeds the hydraulic pressure on the downstream side, the hydraulic pressure is supplied (recharged) to the downstream side via the bypass oil passage 53c and the one-way valve 53c1. When the hydraulic pressure on the downstream side becomes the upper limit holding hydraulic pressure HP, the electric power supply to the motor 52 is stopped, and generation of the hydraulic pressure is stopped. Thereby, the hydraulic pressure on the downstream side is maintained between the upper limit holding hydraulic pressure HP and the lower limit holding hydraulic pressure LP, and the clutch device 26 is maintained in the engaged state. The regions D to F are defined as a cruise region.

When the transmission 21 becomes in neutral at the time of stopping of the motorcycle 1, the electric power supply to both the motor 52 and the solenoid valve 56 is stopped. Thereby, the master cylinder 51 stops generation of the hydraulic pressure and stops supply of the hydraulic pressure to the slave cylinder 28. The solenoid valve 56 becomes in an open state, and the hydraulic pressure in the downstream-side oil passage 53b is caused to return to the reservoir 51e. Accordingly, the slave cylinder 28 side (downstream side) becomes in a low-pressure state lower than the touch point hydraulic pressure TP, and the clutch device 26 becomes in a non-engaged state. This state corresponds to regions G and H in FIG. 5. The regions G and H are defined as a stop region.

In a state where the transmission 21 is in a neutral state when the motorcycle 1 is stopped, the electric power supply to the motor 52 is cut off, and the motorcycle 1 becomes in a stop state. Therefore, the hydraulic pressure becomes a value close to zero.

On the other hand, when the transmission 21 remains in a gear connection state at the time of stopping of the motorcycle 1, the motorcycle 1 becomes in a standby state in which a standby hydraulic pressure WP is applied to the slave cylinder 28 side.

The standby hydraulic pressure WP is a hydraulic pressure (hydraulic pressure applied in the regions A and H in FIG. 5) that is slightly lower than the touch point hydraulic pressure TP which starts connection of the clutch device 26 and is a hydraulic pressure that does not connect the clutch device 26. By applying the standby hydraulic pressure WP, an invalid stroke of the clutch device 26 (cancellation of a backlash or an operation reaction force of each part, application of pre-load to the hydraulic pressure passage, and the like) becomes possible, and operation responsiveness at the time of connection of the clutch device 26 is enhanced.

<Gear Shift Control>

Next, a gear shift control of the motorcycle 1 is described.

In a gear connection stop state in which a gear position of the transmission 21 is in a first speed gear connection state and a vehicle speed is less than a set value corresponding to a stop, the motorcycle 1 of the present embodiment performs a control in which the standby hydraulic pressure WP supplied to the slave cylinder 28 is reduced when a shift operation from the first speed to neutral is performed with respect to the shift pedal 32.

Here, in a case where the motorcycle 1 is in a stop state, and the gear position of the transmission 21 is at any position of the gear shift stages other than neutral, that is, a case where the transmission 21 is in the gear connection stop state, a preset standby hydraulic pressure WP is supplied to the slave cylinder 28.

At a normal time (in a case of a non-detection state in which the gear shift operation of the shift pedal 32 is not detected), the standby hydraulic pressure WP is set to a first set value P1 (refer to FIG. 5) which is a standard standby hydraulic pressure. Thereby, the clutch device 26 is in a standby state in which an invalid stroke is provided, and responsiveness at the time of clutch engagement is enhanced. That is, when the driver increases a throttle opening degree and increases the rotation number of the engine 13, engagement of the clutch device 26 is immediately started by the supply of the hydraulic pressure to the slave cylinder 28, and the motorcycle 1 can be quickly started and accelerated.

In order to detect a shift operation of the driver with respect to the shift pedal 32, the motorcycle 1 includes a shift operation detection switch 48 in addition to the shift load sensor 73.

Then, when the shift operation detection switch 48 detects a shift operation from the first speed to neutral in the gear connection stop state, the hydraulic pressure control part 61 performs a control of setting the standby hydraulic pressure WP to a second set value P2 (low-pressure standby hydraulic pressure, refer to FIG. 5) that is lower than the first set value P1 before the gear shift operation is performed.

In a case where the transmission 21 is in the gear connection state, since the standard standby hydraulic pressure corresponding to the first set value P1 is supplied to the slave cylinder 28 at a normal time, a so-called drag occurs slightly in the clutch device 26. At this time, the dog and the slot (dog hole) that are engaged with each other in a dog clutch of the transmission 21 may press each other in a rotation direction, cause resistance to disengagement, and make the shift operation heavier. In such a case, when the standby hydraulic pressure WP supplied to the slave cylinder 28 is reduced to the low-pressure standby hydraulic pressure corresponding to the second set value P2, the dog and the slot are easily disengaged, and the shift operation becomes lighter.

<Clutch Control Mode>

Figure 6:
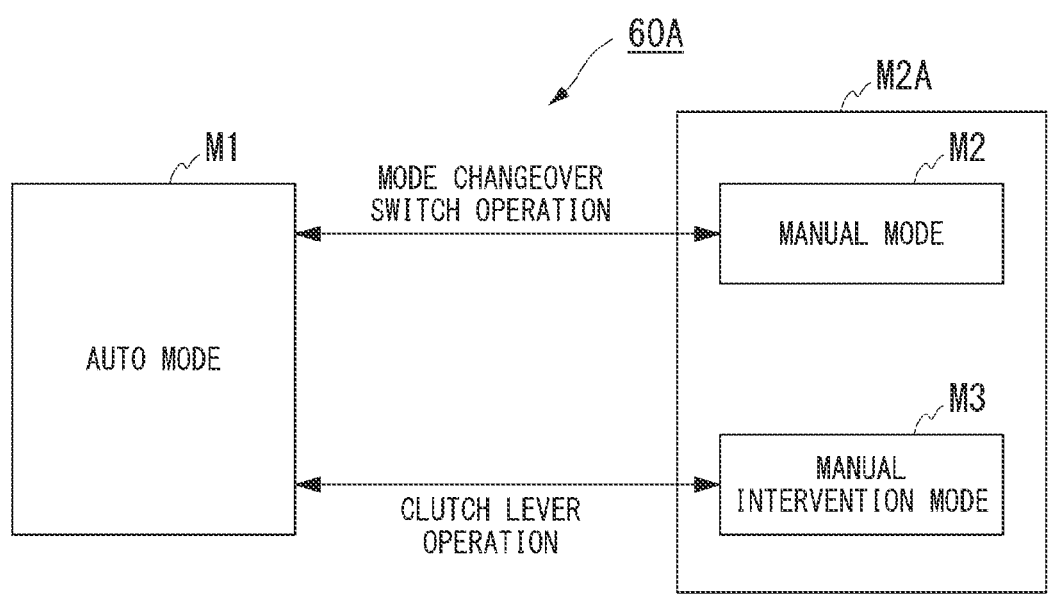
FIG. 6 is a view showing a transition of a clutch control mode in the embodiment of the present invention.

As shown in FIG. 6, the clutch control apparatus 60A of the present embodiment includes three types of clutch control modes. The clutch control mode is suitably shifted among the three types of modes, namely an auto mode M1 in which an automatic control is performed, a manual mode M2 in which a manual operation is performed, and a manual intervention mode M3 in which a temporary manual operation is performed in response to an operation of a clutch control mode changeover switch 59 (refer to FIG. 4) and a clutch lever 4b (refer to FIG. 1). A target including the manual mode M2 and the manual intervention mode M3 is referred to as a manual system M2A.

The auto mode M1 is a mode in which a clutch capacity suitable for a travel state is calculated according to an auto start and a transmission control, and the clutch device 26 is controlled. The manual mode M2 is a mode in which the clutch capacity is calculated in response to a clutch operation command by an occupant, and the clutch device 26 is controlled. The manual intervention mode M3 is a temporal manual operation mode in which a clutch operation command from the occupant is received during the auto mode M1, the clutch capacity is calculated based on the clutch operation command, and the clutch device 26 is controlled. The manual intervention mode M3 is set to return to the auto mode M1 when the occupant stops (completely releases) the operation of the clutch lever 4b during the manual intervention mode M3.

The clutch control apparatus 60A of the present embodiment drives the clutch actuator 50 (refer to FIG. 3) and generates a clutch control hydraulic pressure. Therefore, when the system is started, the clutch control apparatus 60A starts a control from a clutch-off state (a disconnection state) in the auto mode M1. Further, since a clutch operation is not required when the engine 13 stops, the clutch control apparatus 60A is set to return to the clutch-off in the auto mode M1.

In the embodiment, the clutch control device 60A constitutes a clutch control system together with the clutch lever 4b.

In the auto mode M1, the clutch control is basically performed automatically, and the motorcycle 1 is capable of traveling without a lever operation. In the auto mode M1, the clutch capacity is controlled by the throttle opening degree, the engine rotation number, a vehicle speed, and a shift sensor output. Thereby, the motorcycle 1 can be started only by the throttle operation without an engine stall (engine stop), and the speed can be changed only by a shift operation. However, at the time of an extremely low speed that corresponds to idling, the clutch device 26 may be automatically disconnected. Further, in the auto mode M1, the mode becomes the manual intervention mode M3 by gripping the clutch lever 4b, and it is also possible to arbitrarily disconnect the clutch device 26.

On the other hand, in the manual mode M2, the clutch capacity is controlled by the lever operation by the occupant. It is possible to switch between the auto mode M1 and the manual mode M2 by operating the clutch control mode changeover switch 59 (refer to FIG. 4) when the vehicle is stopped. The clutch control apparatus 60A may include an indicator which indicates that the lever operation is active when shifting to the manual system M2A (the manual mode M2 or the manual intervention mode M3).

In the manual mode M2, the clutch control is basically performed manually, and the clutch hydraulic pressure can be controlled in accordance with the operation angle of the clutch lever 4b. Thereby, the connection/disconnection of the clutch device 26 can be controlled in accordance with the intention of the occupant, and even at the time of an extremely low speed that corresponds to idling, the clutch device 26 can be connected, and the vehicle can travel. However, depending on the lever operation, the engine may be stalled, and it is also impossible to start automatically only by the throttle operation.

Even in the manual mode M2, the clutch control automatically intervenes at the time of a shift operation.

In the auto mode M1, although the connection/disconnection of the clutch device 26 is automatically performed by the clutch actuator 50, a manual clutch operation with respect to the clutch lever 4b is performed, and thereby, it is possible to allow the manual operation to temporarily intervene in the automatic control of the clutch device 26 (the manual intervention mode M3).

<Manual Clutch Operation>

As shown in FIG. 1, the clutch lever 4b as a clutch manual operation element is attached to a base end side (inner side in the vehicle width direction) of a left grip of the steering handle 4a. The clutch lever 4b functions as an operation element that transmits a clutch operation request signal to the ECU 60 without a mechanical connection with the clutch device 26 using a cable, a hydraulic pressure, or the like. That is, the motorcycle 1 employs a clutch-by-wire system in which the clutch lever 4b and the clutch device 26 are electrically connected.

With reference also to FIG. 4, a clutch lever operation amount sensor 4c that detects an operation amount (rotation angle) of the clutch lever 4b is integrally provided on the clutch lever 4b. The clutch lever operation amount sensor 4c converts an operation amount of the clutch lever 4b into an electric signal and outputs the electric signal. In a state (the manual system M2A) where the operation of the clutch lever 4b is effective, the ECU 60 drives the clutch actuator 50 on the basis of the output of the clutch lever operation amount sensor 4c. The clutch lever 4b and the clutch lever operation amount sensor 4c may be integrated with or separated from each other.

The motorcycle 1 includes the clutch control mode changeover switch 59 that switches a control mode of the clutch operation. Under a predetermined condition, the clutch control mode changeover switch 59 can arbitrarily switch between the auto mode M1 that automatically performs a clutch control and the manual mode M2 that manually performs the clutch control in response to the operation of the clutch lever 4b. For example, the clutch control mode changeover switch 59 is provided on a handle switch attached to the steering handle 4a. Thereby, the occupant can easily operate the clutch control mode changeover switch 59 at the time of ordinary driving.

<Clutch Temperature Correction Control>

Figure 10:
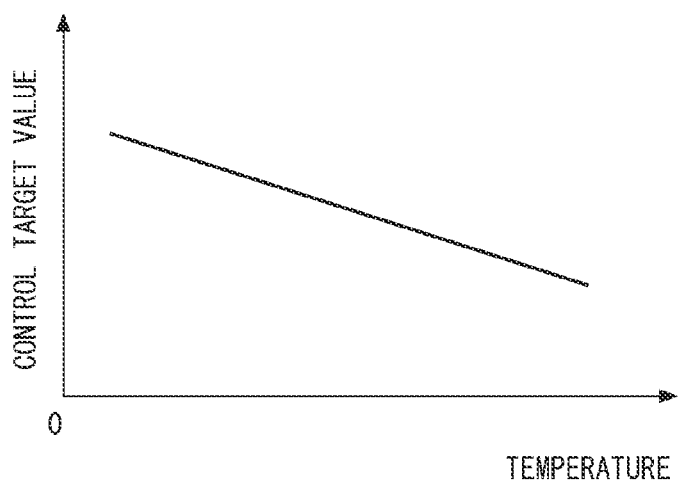
FIG. 10 is a graph showing a correlation between a control target value of the clutch actuator and a temperature of the slave cylinder.

The ECU 60 performs a correction control of a control target value in accordance with a temperature change of the clutch device 26 when performing the clutch control of each mode described above. The ECU 60 stores correlation data between the temperature and the control target value in the memory 62 in advance, for example, as shown in FIG. 10. The ECU 60 corrects the control target value on the basis of the temperature measured by the temperature sensor 49. The ECU 60 corrects the control target value in accordance with the temperature measured by the temperature sensor 49 on the basis of the correlation data between the temperature and the control target value stored in the memory 62. The ECU 60 reduces the control target value as the temperature measured by the temperature sensor 49 increases. Here, the control target value is a clutch capacity that is a point (that is, a touch point hydraulic pressure) at which the connection of the clutch device 26 starts.

As described above, the clutch control apparatus 60A of the embodiment described above includes: the clutch device 26 that connects and disconnects a power transmission between the engine 13 and the transmission 21; the clutch actuator 50 that generates a hydraulic pressure and changes a clutch capacity of the clutch device 26; the slave cylinder 28 that drives the clutch device 26 by the hydraulic pressure generated by the clutch actuator 50; the ECU 60 that calculates a control target value of the clutch capacity; and the temperature sensor 49 that measures a temperature of the slave cylinder 28. The ECU 60 corrects the control target value on the basis of the temperature measured by the temperature sensor 49. The ECU 60 measures the temperature of the slave cylinder 28 using the temperature sensor 49 and thereby detects the temperature change of the clutch device 26. The ECU 60 corrects the control target value of the clutch capacity on the basis of the measured temperature. The ECU 60 adjusts the point at which the clutch device 26 is connected and disconnected in accordance with the temperature of the slave cylinder 28.

According to this configuration, by correcting the control target value of the clutch capacity on the basis of an actual measurement value of the temperature of the slave cylinder 28 measured by the temperature sensor 49, it is possible to perform a further highly accurate control compared to a configuration that estimates a temperature around the clutch and performs a control.

Further, in the embodiment described above, by arranging the slave cylinder 28 and the temperature sensor 49 on the clutch cover 72 that covers the clutch device 26, the slave cylinder 28 is arranged close to the clutch device 26, the slave cylinder 28 and the clutch device 26 are capable of directly interlocking with each other, the temperature sensor 49 is arranged close to the slave cylinder 28, the temperature of the slave cylinder 28 is directly measurable, and it is possible to perform a further highly accurate control.

Further, in the embodiment described above, by also fixing the temperature sensor 49 to the cylinder fixation part 72a having a cylindrical shape for fixing the slave cylinder 28 in the clutch cover 72, the cylinder fixation part 72a concurrently serves as the fixation part of the slave cylinder 28 and the fixation part of the temperature sensor 49, and it is possible to reduce the size and weight by rationalization.

Further, in the embodiment described above, the slave cylinder 28 includes the piston 28p that drives the clutch device 26 using the hydraulic pressure. When the clutch device 26 is operated, the temperature of the slave cylinder 28 increases in accordance with the movement of the piston 28p of the slave cylinder 28 by the hydraulic pressure. The slave cylinder 28 is susceptible to the temperature since the friction of the piston stroke is changed by a temperature change. In this way, by detecting the temperature of the hydraulically operated slave cylinder 28 that is susceptible to the temperature and performing a control, it is possible to perform a further highly accurate control.

Further, in the embodiment described above, since the detection part 49s of the temperature sensor 49 is provided to be directed to the slave cylinder 28, it is possible to further accurately detect the temperature of the slave cylinder 28 and perform a further highly sensitive control.

Further, in the embodiment described above, since the control target value is reduced as the temperature measured by the temperature sensor 49 becomes higher, it is possible to appropriately adjust a point at which the clutch device 26 is connected and disconnected in accordance with the thermal expansion such as a clutch plate that constitutes the clutch device 26, and it is possible to control the clutch capacity with high accuracy.

Further, in the embodiment described above, with respect to correcting the control target value, by correcting the control target value (clutch capacity) that corresponds to the point (touch point hydraulic pressure) at which the connection of the clutch device 26 starts, it is possible to reduce a temperature effect in the connection/disconnection control of the clutch device 26 and perform a highly accurate control.

The present invention is not limited to the embodiment described above. For example, the present invention is not limited to an application to a configuration in which the clutch is connected by an increase in the hydraulic pressure, and the clutch is disconnected by a decrease in the hydraulic pressure and may be applied to a configuration in which the clutch is disconnected by an increase in the hydraulic pressure and the clutch is connected by a decrease in the hydraulic pressure.

The clutch operation element is not limited to the clutch lever and may be a variety of operation elements such as a clutch pedal or other operation elements.

The present invention is not limited to an application to a saddle-riding type vehicle in which a clutch operation is automated as in the embodiment described above and is also applicable to a saddle-riding type vehicle that includes a so-called transmission device without a clutch operation that enables gear shifting by adjusting a drive force without performing a manual clutch operation under a predetermined condition while the clutch operation is basically the manual clutch operation.

Further, the saddle-riding type vehicle described above includes general vehicles on which a driver rides by straddling a vehicle body. The saddle-riding type vehicle described above includes not only motorcycles (including motorized bicycles and scooter type vehicles) but also three-wheeled vehicles (including vehicles with two front wheels and one rear wheel in addition to vehicles with one front wheel and two rear wheels) or four-wheeled vehicles. The saddle-riding type vehicle described above includes vehicles including an electric motor as an engine.

The configuration in the embodiment described above is an example of the present invention, and various changes can be made without departing from the scope of the present invention.

DESCRIPTION OF THE REFERENCE SYMBOLS

1 Motorcycle (saddle-riding type vehicle)
12 Rear wheel (drive wheel)
13 Engine (motor)
21 Transmission
26 Clutch device
28 Slave cylinder (driven mechanism)
28*p* Piston
49 Temperature sensor
49*s* Detection part
50 Clutch actuator
60 ECU (control part)
60A Clutch control apparatus
72 Clutch cover (cover member)
72*a* Cylinder fixation part (fixation part)
TP Touch point hydraulic pressure (point)

What is claim is:

1. A clutch control apparatus, comprising:
a clutch device that connects and disconnects a power transmission between an engine and a drive wheel;
a clutch actuator that drives the clutch device and changes a clutch capacity;
a driven mechanism that is arranged between the clutch actuator and the clutch device, is operated by a drive of the clutch actuator, and operates the clutch device;
a control part that calculates a control target value of the clutch capacity;
a temperature sensor that measures a temperature of the driven mechanism; and
a cover member comprising a clutch cover that covers the clutch device,
wherein the control part corrects the control target value based on the temperature measured by the temperature sensor,
wherein the cover member includes a fixation part having a cylindrical shape to which the driven mechanism is fitted, and
the temperature sensor is attached to the fixation part.

2. The clutch control apparatus according to claim 1,
wherein the engine comprises the cover member, wherein the cover member covers an outer part of the engine, and
wherein the driven mechanism and the temperature sensor are arranged on the cover member.

3. The clutch control apparatus according to claim 1,
wherein the driven mechanism is a slave cylinder that includes a piston which is driven by a hydraulic pressure.

4. The clutch control apparatus according to claim 1,
wherein a detection part of the temperature sensor is provided to be directed toward the driven mechanism.

5. The clutch control apparatus according to claim 1,
wherein the control part reduces the control target value as the temperature measured by the temperature sensor becomes higher.

6. The clutch control apparatus according to claim 1,
wherein the control target value is a value that corresponds to a point at which a connection of the clutch device starts.

7. A clutch control apparatus, comprising:
a clutch device that connects and disconnects a power transmission between an engine and a drive wheel;
a clutch actuator that drives the clutch device and changes a clutch capacity;
a driven mechanism that is arranged between the clutch actuator and the clutch device, is operated by a drive of the clutch actuator, and operates the clutch device;
a control part that calculates a control target value of the clutch capacity;
a temperature sensor that measures a temperature of the driven mechanism; and
a cover member comprising a clutch cover that covers the clutch device,
wherein the control part corrects the control target value based on the temperature measured by the temperature sensor, and
wherein a detection part of the temperature sensor is provided to be directed toward the driven mechanism.

8. The clutch control apparatus according to claim 7,
wherein the engine comprises the cover member, wherein the cover member covers an outer part of the engine, and
wherein the driven mechanism and the temperature sensor are arranged on the cover member.

9. The clutch control apparatus according to claim 7,
wherein the cover member includes a fixation part having a cylindrical shape to which the driven mechanism is fitted, and
the temperature sensor is attached to the fixation part.

10. The clutch control apparatus according to claim 7, wherein the driven mechanism is a slave cylinder that includes a piston which is driven by a hydraulic pressure.

11. The clutch control apparatus according to claim 7, wherein the control part reduces the control target value as the temperature measured by the temperature sensor becomes higher.

12. The clutch control apparatus according to claim 7, wherein the control target value is a value that corresponds to a point at which a connection of the clutch device starts.

* * * * *